United States Patent [19]

Barclay

[11] Patent Number: 4,738,172
[45] Date of Patent: Apr. 19, 1988

[54] APPARATUS FOR DEBEADING A SCRAP TIRE

[76] Inventor: Randel L. Barclay, 5616 Carpenter Rd., Stockton, Calif. 95205

[21] Appl. No.: 1,686

[22] Filed: Jan. 9, 1987

[51] Int. Cl.$^4$ .................... B02C 18/06; B02C 23/02; B26D 7/14
[52] U.S. Cl. ......................................... 83/18; 83/19; 83/175; 83/176; 83/437; 83/675; 83/923; 83/925 R; 241/DIG. 31
[58] Field of Search ................... 83/18, 19, 176, 175, 83/432, 437, 923, 925 R, 675; 241/101.2, 222, 235, DIG. 31

[56] References Cited

U.S. PATENT DOCUMENTS

| | | | |
|---|---|---|---|
| 3,843,074 | 10/1974 | Tupper | 83/176 |
| 3,911,772 | 10/1975 | Kisielewski | 83/278 |
| 4,216,916 | 8/1980 | Tupper | 241/DIG. 31 |
| 4,338,839 | 7/1982 | Farrell, Sr. et al. | 83/620 |
| 4,338,840 | 7/1982 | Farrell, Sr. et al. | 83/620 |
| 4,422,581 | 12/1983 | Chryst | 241/DIG. 31 |

FOREIGN PATENT DOCUMENTS

| | | | |
|---|---|---|---|
| 3413614 | 10/1985 | Fed. Rep. of Germany | 241/DIG. 31 |
| 2045108 | 10/1980 | United Kingdom | 241/DIG. 31 |
| 937226 | 6/1982 | U.S.S.R. | 241/DIG. 31 |

Primary Examiner—E. R. Kazenske
Assistant Examiner—Hien H. Phan
Attorney, Agent, or Firm—Thomas Schneck

[57] ABSTRACT

An apparatus for removing the bead wires from a scrap tire having a pair of overlapping and counterrotating shearing members and a movable carriage. The carriage includes a plurality of rolls positioned to fit within the inside diameter of a tire. One of these rolls is a tensioning roll that is movable so as to stretch the tire and elongate the bead wires. This elongation crowds the bead wires against a crowding bar. The crowding bar and a pair of compression rollers are mounted to a rod which is moved downwardly when the carriage is advanced toward the shearing members, said compression rollers being positioned to apply compression force to the side wall of the tire as the rollers descend. The compression force aligns the bead wires with a bead guide roll so that the crowding bar may be pivoted away from the subsequent shearing action, the bead wires then being crowded against the bead guide roll. At the same time a spring biased lower compression roller is cammed upward to apply compression force to the lower side wall. The carriage is advanced until the shearing members have made a first tire shear that is at least closely tangential to the bead wire against the bead guide roll. When the pinch point of the shearing members is proximate the bead wires, forward movement of the carriage is stopped. However, the tire is caused to be rotated about its axis by the shearing members to produce a second shear that is substantially concentric with the bead wires, the first and second shears being a single continuous motion.

17 Claims, 5 Drawing Sheets

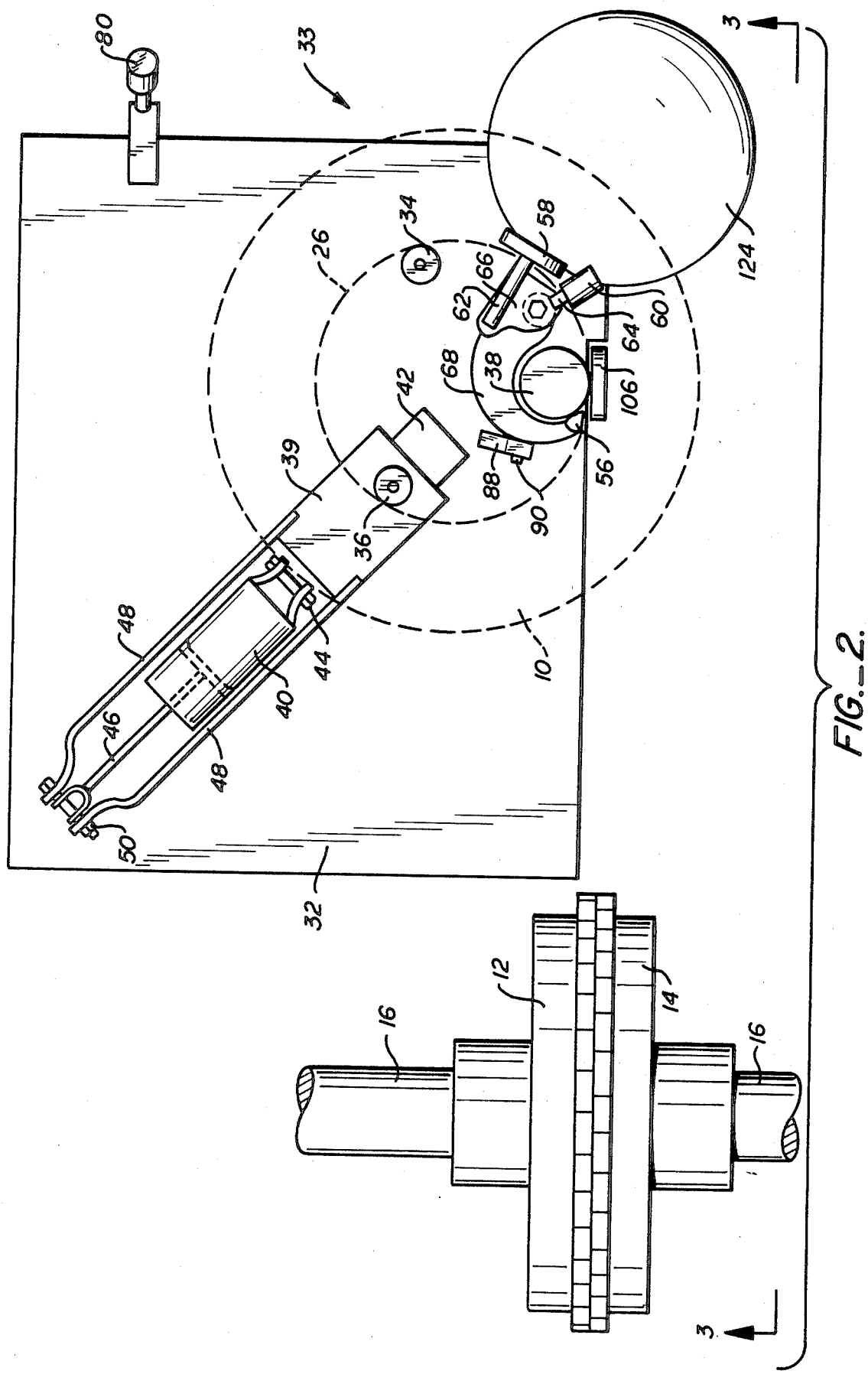
FIG._2.

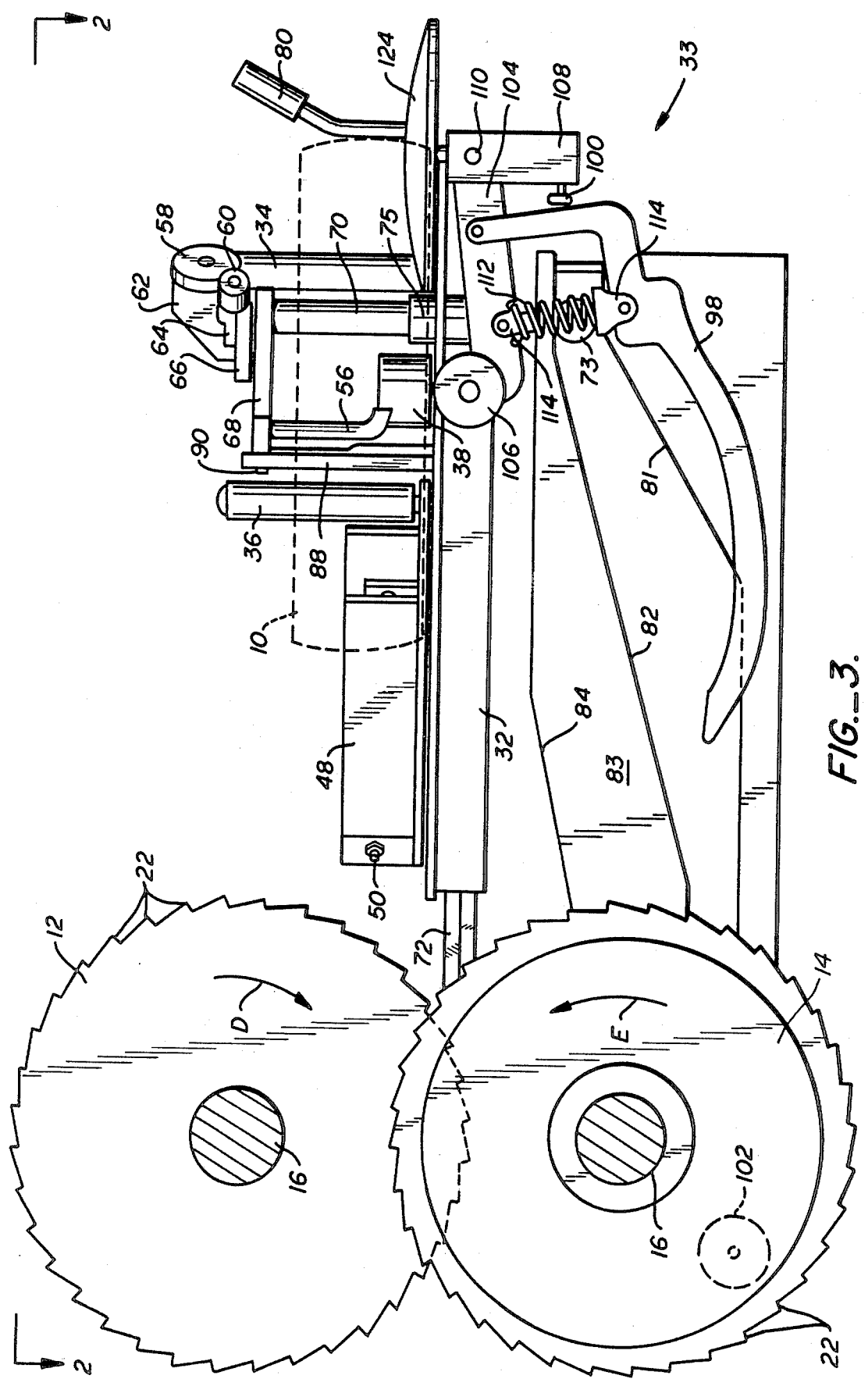
FIG._3.

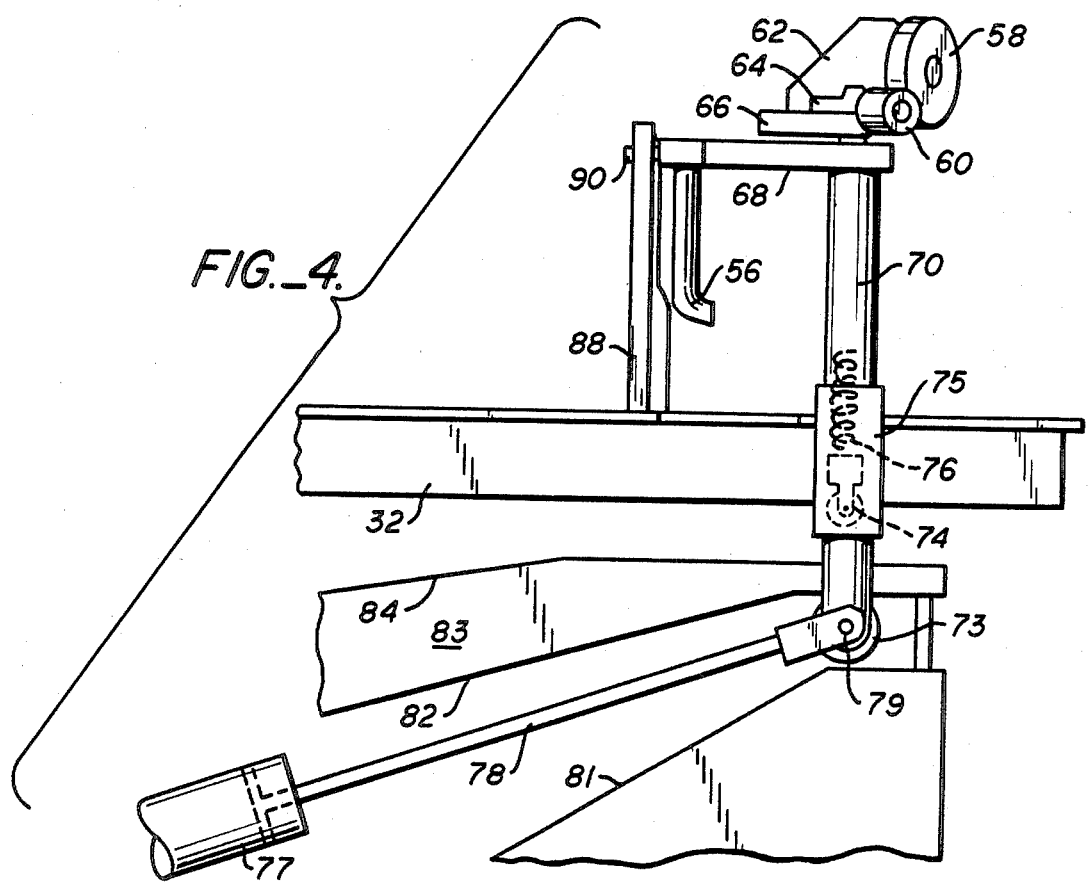
FIG._4.
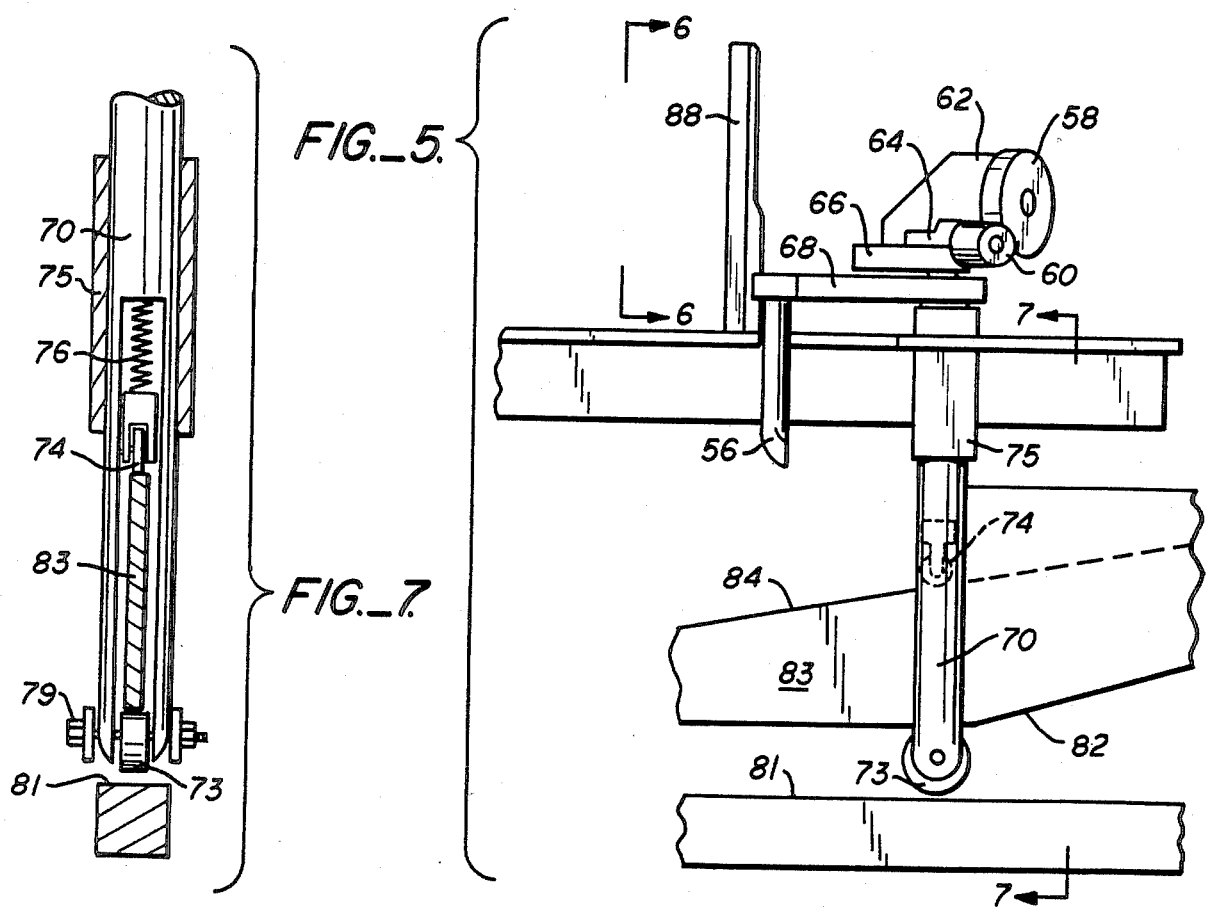
FIG._5.
FIG._7.

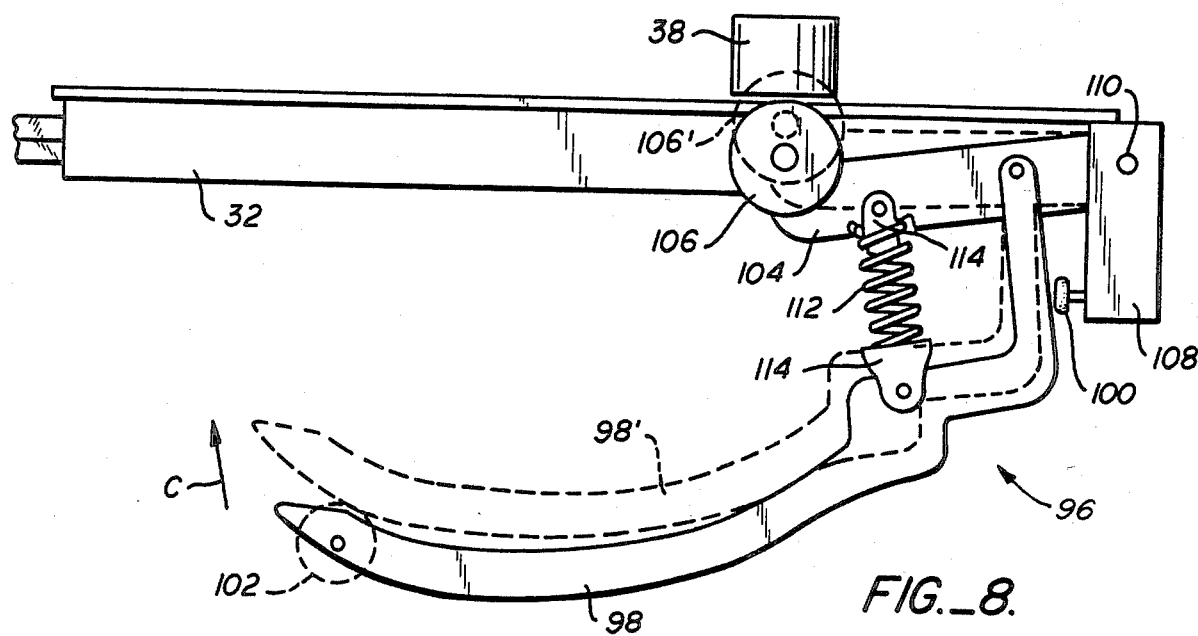
FIG._8.
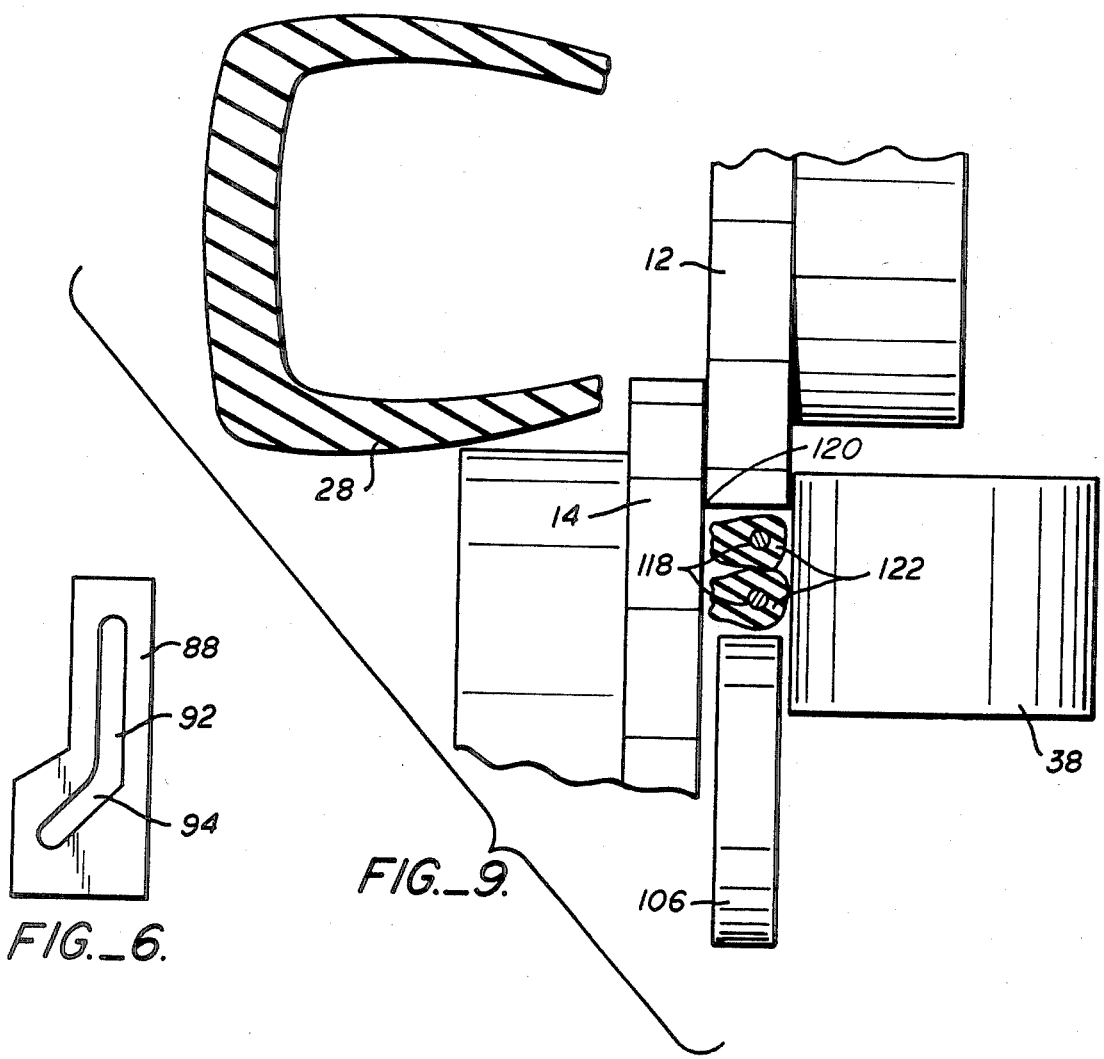
FIG._9.
FIG._6.

APPARATUS FOR DEBEADING A SCRAP TIRE

DESCRIPTION

1. Technical Field

The present invention relates to apparatus for removing the bead wires from a scrap tire for transportation or further reduction in other equipment.

2. Background Art

To date the problems of disposing, storing and transporting discarded tires are many and varied. In recycling tires for fuel, the most utilized method is cutting scrap tires into small chips. This has generally proved not to be cost effective since the cost of collecting, transporting and cutting the tires is frequently more than the return in value as fuel.

The dimensions of a tire make it difficult to stack tires in a low volume. In transporting tires to a recycling plant, motor trucks at times carry only about one-half of a full load by weight. Since a motor truck not loaded to its full weight potentially costs very nearly as much to operate as one that is, the cost effectiveness of recycling scrap tires may be increased by increasing the weight load carried by the motor truck.

The weight load of scrap tires that may be carried by a motor truck can be increased by providing a mobile cutting apparatus that cuts the scrap tires into smaller pieces before the tires are placed within the motor vehicle. U.S. Pat. No. 3,911,772 to Kisielewski discloses a mobile material cutter that makes a diametrical cut across a tire to halve the tire. While this halving of a tire permits an increased weight load for motor trucks, a full load is still not possible. U.S. Pat. Nos. 4,338,839 and 4,338,840 to Farrell, Sr. et al. disclose portable cutting machines which quarter a tire by means of a hydraulic cylinder ram which drives blades into the tire. It has been shown, however, that quartering a tire will still not permit full load transportation.

Tires are highly resilient. This resiliency is a result of bead wires which are positioned within the circumferential surface of the inside diameter of each side wall. Resiliency is necessary for the proper functioning of a tire but makes stacking, storing and reducing scrap tires burdensome. It is therefore desirable to remove the bead wires from a tire after the tire is no longer useful.

Prior art methods of debeading a tire utilize dies which punch out the bead wires. This method is both expensive and inefficient since a different die must be employed for each size of tire. Soviet Certificate No. 937,226 to Cochob describes an apparatus which brings a scrap tire toward rotatable slicing discs in a direction that is parallel to the axis of disc rotation. The tire is caused to rotate by the utilization of clamping rollers so the interaction of the tire rotation, the slicing discs and the movement of the tire perpendicular to the discs, causes the tire to be reduced to two elongated slices joined at a front end. The movement of the tire perpendicular to the disc is discontinued before the bead wires reach the slicing discs. While the Soviet apparatus has its advantages, the production of an elongated slice is time consuming and power inefficient.

An object of the present invention is to provide an apparatus which separates the bead wires of a tire from the outer casing. A further object is to provide such an apparatus which is both time and cost efficient.

DISCLOSURE OF THE INVENTION

The above objects have been met by a tire debeader which continuously circumferentially shears a tire about its bead wires during distinct tire movements into the shear. A first cut, or shear, results from linear tire movement toward counterrotating circular shearing members in a direction that is at least closely tangential to the bead wires. When the first cut reaches a point at or near the bead wires, the linear tire movement is ceased. However, the shearing force continues to draw the tire and causes rotational tire movement, thereby making a second cut which is substantially concentric with the inside circumference of the tire. As a result of the sequential cuts, the bead wires are completely disembodied from the outer casing of the tire. The rotating shearing members do not make contact with the metal bead wires, thereby eliminating the primary cause of knife deterioration in tire cutting devices. After the bead wires have been removed, tires may be rolled into a spiral for transporting or storing, significantly reducing the required space.

The debeading machine of the present invention includes a movable carriage having a number of guide rolls spaced apart to contact various areas within the inside diameter of the tire. The guide rolls include a tensioning roll linked to an air cylinder so that actuation of the cylinder causes the tensioning roll to elongate the tire. This ability to elongate the tire permits the machine to debead tires of various sizes.

A precompression roller is mounted above carriage level perpendicularly to the axis of the tire. A compression roller is similarly mounted but the compression roller has a working surface that is somewhat closer to carriage level. The precompression and compression rollers are disposed so that the rollers are above the bead wires of a tire that is positioned about the guide rolls.

A scrap tire is initially placed about the guide rolls when the carriage is in a rearward, tire-loading position. The compression and precompression rollers are coupled to a cammed rod which holds the two rollers in an uppermost position when the carriage is in a rearward position. The movable tensioning roll elongates the tire and causes the inside circumference of the tire to be crowded against a crowding bar indirectly mounted to the rod which provides the cam action to the compression rollers.

As the carriage is moved linearly toward a pair of counterrotating shearing members, cam action lowers the precompression and compression rollers, thereby applying an increasing compression force to the upper side wall of the tire. Linear movement of the carriage causes the rotating shearing members to make a substantially linear cut into the tire. This first cut, or shear, is in a direction that is closely tangential to the bead wires. As this first cut is being made, the crowding bar is caused to pivot toward the center of the tire so as to insure that the bead wires are positioned against the upwardly extending surface of a cylindrical bead guide roll.

When the pinch point created by the shearing members is proximate the bead wires, a stop prevents the carriage from further movement. However, the circumference of each shearing member is saw-toothed, and these teeth create a pull which causes the tire to begin to rotate. Just prior to the start of the tire rotation a lower compression roller is pivoted upward to apply a spring-biased compression force to the lower side wall of the tire. As the tire rotates the outer casing of the tire is disembodied from the bead wires. An idler disc positioned near the shearing facilitates tire rotation.

BRIEF DESCRIPTION OF THE DRAWINGS

FIG. 2 is a top view of a tire debeading apparatus in accord with the present invention.

FIG. 3 is a side view of the debeading apparatus taken along lines 3—3 of FIG. 2.

FIG. 4 is a side view of the upper compression assembly of the apparatus of FIG. 3.

FIG. 5 is a side view of the assembly of FIG. 4 in a shearing position.

FIG. 6 is a rear view of a plate taken along lines 6—6 of FIG. 5.

FIG. 7 is a front view of a cam rod taken along lines 7—7 of FIG. 5.

FIG. 8 is a side view of the lower compression assembly of the of FIG. 3.

FIG. 9 is a front view of the apparatus of FIG. 1 in a shearing operation.

BEST MODE FOR CARRYING OUT THE INVENTION

Figure 1:
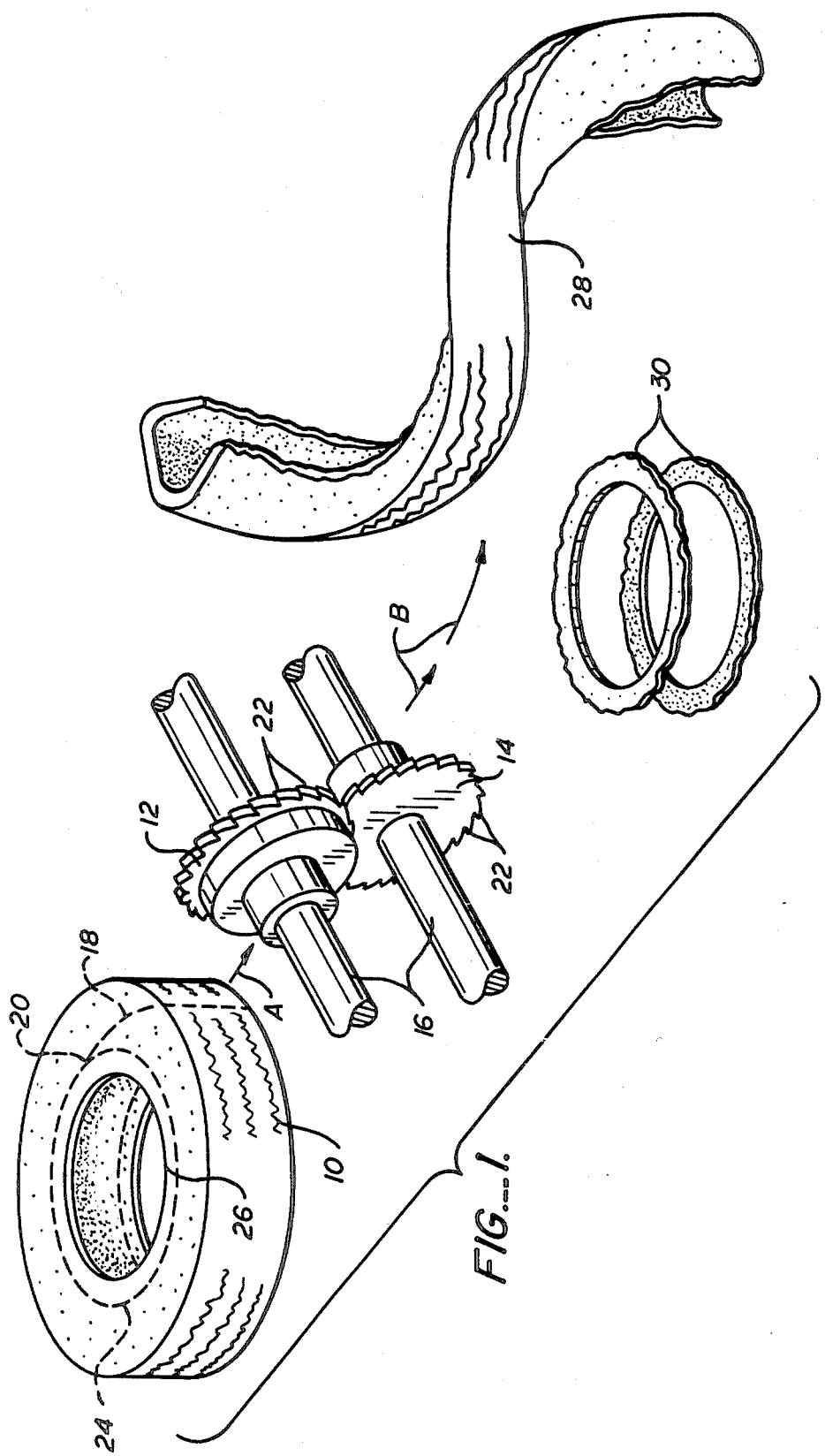
FIG. 1 is a plan view of the tire debeading operation carried but by utilization of the present invention.

With reference to FIG. 1, a tire 10 is fed into a pair of counterrotating shears 12 and 14 that are mounted on parallel shafts 16. Linear movement of the tire in the direction of Arrow A produces a first cut 18. When the tire reaches a point 20 at which the pinch point of the shears is near the bead wires of the tire, linear tire movement ceases. However, saw-teeth 22 on the circumferences of the shears 12 and 14 continue to draw the tire toward the shears, producing a second cut 24 that is concentric the inside circumference 26 of the tire. The outer casing 28 of the tire 10 travels past the shears 12 and 14, as indicated by Arrow B. In this manner the outer casing is disembodied from the pair of bead wires 30 of the tire.

Referring now to FIGS. 2 and 3, the tire 10 is supported atop a carriage 32 of the debeading machine 33. An upright stationary roll 34 contacts the tire along a first area of the inside circumference of the tire. A movable tensioning roll 36 and a bead guide roll 38 also contact the inside circumference so that the tire is fixed in position atop the carriage. It is understood that rolls 34, 36, 38 are not limited to the cylindrical configuration illustrated in the drawings. The rolls may be semicircular posts or may have any other configuration which does not restrict rotation of the tire about its axis. Likewise, the rolls may be fixed or may be rotatable.

The movable tensioning roll 36 enables the debeading machine to disembody a variety of sized tires. Critical to proper operation of the machine, as illustrated, is that the bead wires of the tire be crowded against the bead guide roll 38 when the shearing takes place. The tensioning roll 36 insures that the bead wires are elongated and do, in fact, crowd the bead guide roll.

The tensioning roll 36 is mounted to a slide 39 which is controlled by a tensioning air cylinder 40 and is moved within a carriage slot 42. The tensioning air cylinder has a stationary end 44 which is fixed to the carriage 32. The opposite end of the cylinder has a cylinder rod 46 which is extended in accordance with the air pressure applied to the cylinder 40. The movement of the cylinder rod 46 is translated to the slide 39 by means of a bracket 48 attached to the cylinder rod by a pin-and-nut arrangement 50. As the cylinder rod 46 is extended from the tensioning air cylinder, the bead wires of the tire are elongated by the force of the tensioning roll 36. Elongation of the bead wires crowds the bead wires against the stationary roll 34 and against the area of the bead guide roll 38.

As can be seen in FIG. 3, at least initially the height of the tire 10 will prevent an upper bead wire from contacting the bead guide roll 38. For this reason, a hooked crowding bar 56 is positioned so that the upper bead wire will be pressed against the bar 56. Preferably, the crowding bar has a length that causes both the upper and the lower bead wires to be crowded against the bar when the bead wires are elongated.

Even after elongation of the bead wires, a tire is not aligned properly for the shears 12 and 14 to make the desired cuts. The bead wires must be drawn together against the bead guide roll 38, in alignment with the pinch point of the shears. A precompression roller 58 and a compression roller 60 provide compression force to the inside diameter of the tire. The precompression roller and compression roller are rotatably mounted to upright plates 62 and 64 which are each attached to a fixed plate 66. Below the fixed plate 66 is a pivoting plate 68, both plates 66 and 68 being mounted to a rod 70.

The carriage 32 is supported on rails 72 by a set of six ball bearings, not shown. FIGS. 3 and 4 show the carriage 32 in a rearward position. In this position the precompression roller 58 and the compression roller 60 are held upward by a lower wheel 73 at the end of the rod 70 and by an upper wheel 74. The upper wheel is attached to the portion of the rod that is slidably fit into a sleeve 75 fixed to the carriage 32. A spring 76 biases the rod 70 upwardly when weight from the rod is transferred to the upper wheel 74. FIG. 4 shows the upper wheel 74 as being spaced apart from any supporting surface, but the position of this wheel when the carriage is in a rearward position is dependent on the elasticity of the spring 76.

Movement to the carriage 32 is provided by a second air cylinder 77. A cylinder rod 78 is fixed to the lower wheel 73 and the rod 70 by a pin-and-nut arrangement 79. The tensioning air cylinder 40 and the advancement air cylinder 77 are operationally interconnected to ensure the proper sequence of steps in debeading a tire. Both air cylinders 40 and 77 work off a common hand actuated air valve, not shown. The tensioning air cylinder charges immediately. After an internal pressure of 100 psi is reached, a dump valve allows air pressure to continue to the advancement air cylinder. Thus, the carriage is not set in motion until the bead wires have been elongated. A carriage lock 80 may be used to lock the carriage in position for safety.

Forward movement of the carriage 32 causes the rod 70 to descend as the lower wheel 73 follows a lower cam surface 81. However, the wheel 73 will gravity fall only until the compression roller 60 contacts the side wall of the tire. Any forward movement beyond this point lifts the lower wheel 73 from the lower cam surface. The lower wheel 73 will provide compression force to the side wall of the tire only when the wheel is forced downwardly by an upper cam surface 82 that is part of a cam plate 83.

During rearward motion of the carriage 32, on the other hand, the upper wheel 74 follows a return cam surface 84 that is part of the cam plate 83. As the upper wheel ramps up the cam surface 84 the rod 70 rises to return the compression rollers 58 and 60 toward a tire loading position. When the carriage nears its rearward position, the lower wheel 73 engages the lower cam surface 81 to provide a fast rise to the rod 70.

FIGS. 5 and 7 illustrate the positioning of the above-described compression assembly when the carriage 32 is in a forward position. For purposes of clarity, the tire and the bead guide roll are omitted. The interaction of the upper cam surface 82, the lower wheel 73 and the rod 70 applies compression force to the side wall of the tire. Wheel 73 is rotatably mounted to the rod by the pin-and-nut arrangement 79. The working surface of the precompression roller 58 is slightly higher than the working surface of the compression surface. The precompression roller provides the initial compression so that the compression roller may bring the bead wires to a gauged height without regard to the original size of the tire.

As noted above, elongation of the tire crowds the bead wires against the crowding bar 56. When the side wall of the tire has been compressed, the bead wires are aligned with the bead guide roll 38. At that point the crowding bar has served its purpose. Thus, a slotted plate 88 pivots the pivoting plate 68 so that the crowding bar is moved out of the way of the shears and the bead wires are crowded against the bead guide roll 38.

FIG. 6 is a rear view of the slotted plate 88. The pivoting plate 68 has a projection 90 which is slidably connected to the slotted plate. The slot has a vertical portion 92 which, by means of guiding the projection 90, guides the crowding bar 56 so as to descend for alignment of the bead wires with the bead guide roll 38. Then, when the bead wires are properly aligned, the slanted portion 94 of the slot pivots the pivoting plate 68.

Referring now to FIGS. 3 and 8, a lower compression assembly 96 ensures proper alignment of the lower bead wire with the bead guide roll 38. The lower compression assembly includes a cam ramp 98 which is normally held in a lowered rest position and against a nut or bumper 100. However, when the carriage 32 is brought forward the cam ramp is ramped upward on a wheel 102 to a compression position indicated by Arrow C and cam ramp 98'.

The wheel 102 causes the cam ramp 98 to pivot a compression arm 104, thereby bringing a lower compression roller 106 approximately midway up the carriage 32 to a position indicated by the roller 106'. The compression arm 104 is pivotably attached to a plate 108 at a pivot point 110. The lower compression roller 106 applies compression force to the lower bead wire. The compression arm 104 is biased upwardly by a spring 112 which is fixed to brackets 114. Preferably, the lower compression roller is pivoted into engagement with the tire within the last four to six inches of the carriage movement. If the roller 106 were pivoted too soon it is possible that the tire could be lifted away from the carriage, thereby causing positioning problems. Because the compression arm 104 is spring loaded, the lower compression roller 106 may be forced downwardly by a greater volume of rubber. Thus, the bead wires of a variety of different sized tires may be removed by the debeading machine 33.

Referring now to the drawings in general, in operation a tire 10 is placed about the rolls 34, 36 and 38 when the carriage 32 is in a rearward position. In this tire loading position the precompression roller 58 and the compression roller 60 are held high by rod 70, and the lower compression roller 106 is held low by the force of gravity. To compensate for the varying diameters of tires, the tensioning roll 36 is utilized to stretch the tire. The stretching elongates the bead wires of the tire, thereby ensuring that the bead wires are crowded against the crowding bar 56.

When the carriage 32 is advanced forwardly, the lower wheel 73 initially follows the lower cam surface 81 and the compression roller 60 comes to rest atop the area of the tire associated with the upper bead wire. Any further forward movement causes the lower wheel 73 to leave the lower cam surface 81. Eventually, however, the wheel contacts the upper cam surface 82 and the precompression roller 58 and the compression roller 60 begin to apply a compression force to the side wall of the tire.

Simultaneous to the increasing application of compression force, the crowding bar 56 is lowered by the rod 70. When the compression force has brought the bead wire to a height at which the bead wires may be crowded against the bead guide roll 38, the crowding bar is pivoted out of position by plate 88, and the inside circumference of the tire comes to rest against the bead guide roll 38.

Compression force is also provided by the lower compression roller 106. Just as the function of the crowding bar 56 is to ensure that a bead wire does not slide over the top of the bead guide roll 38, the function of the lower compression roller 106 is to prevent a bead wire from being positioned too low. The lower compression roller is forced upwardly at the precise moment prior to shearing. The movement is caused by the interaction of the cam ramp 98 with the wheel 102. The lower compression roller in its highest position is about midway up the table, but the roller is spring loaded so that it can be forced downwardly by the greater volume of rubber of oversized tires.

The precompression roller 58 and the compression roller 60 bring the bead wires of the tire to a gauged height at the rearward side of the bead guide roll 38. Referring specifically to FIGS. 3 and 9, the upper shear 12 aids in the compression process by bringing the forward side of the tire to the pinch point of the shears 12 and 14. The shears each have a saw-toothed outer circumference 22 and are counter-rotational, as indicated by Arrows D and E.

Forward movement of the carriage 32 produces a first cut, or shear, into the tire. This first cut is perpendicular to the axis of the tire. However, when the pinch point of the shears 12 and 14 is adjacent the bead wires 118, as shown in FIG. 9, rails 72 no longer permit linear movement of the tire. Yet, because of the saw-toothed circumference 22 and the shearing force of the shears, the tire continues to be drawn toward the pinch point 120 of the shears. As a result, the tire rotates about the axis of the tire. The inner edge 122 of the tire that is captured between the bead guide roll 38 and the pinch point 120 is stripped away from the outer casing of the tire. The outer casing is deposited on the side of the shears opposite the carriage, and the bead wires 118 remain wrapped about the rolls 34, 36 and 38. FIG. 2 shows that the carriage 32 includes an idler disc 124 which facilitates rotation of the tire when linear movement of the carriage is ceased.

Upon return of the carriage by the air cylinder 77, the upper wheel 74 is ramped up the ascending surface 84 to provide the initial upward motion of the rod 70. However, the final upward motion is caused by the engagement of the lower wheel 73 with the lower cam surface 81.

The drawings illustrate the carriage as being on a horizontal plane. It is to be understood that the carriage may be angled, for example, at 22.5 degrees to slope toward the shears so as to aid in operation of the debeading machine.

The shears typically operate at a speed of 17 rpm, or 98 feet per minute as measured from the pinch point of the shears. This speed, however, is not critical. The shears are driven by a ten horsepower motor.

I claim:

1. A method of removing the bead wires from a tire of a type having an inside diameter, a tire axis and opposed side walls, comprising elongating the portion of a tire associated with bead wires disposed within the tire by applying a stretching force within an inside diameter of the tire, flattening the portion of a tire associated with bead wires disposed within the tire by applying a compression force upon a side wall of the tire at said head wires, linearly advancing the tire along a path intersecting a shearing station, effecting a first shear into the compressed tire by the linear advancement of the tire, said first shear being in a direction that is at least closely tangential to the bread wires within the tire, ceasing linear advancement of the tire when the bead wires are adjacent said shearing station, and effecting a second shear of the tire by rotating the tire about a tire axis.

2. An apparatus for debeading a tire of the type having an axis of rotation, laterally opposed first and second side walls, said first and second side walls each having an inner circumferential edge lying in a plane perpendicular to the axis of rotation and a bead wire closely adjacent said inner circumferential edge, comprising, a tire carriage means having tire positioning means for contacting the inner circumferential edges of first and second tire side walls, said tire carriage means having a path of movement, the path having a rearward tire loading position and a forward shearing position, at least one upper compression roller having an axis perpendicular to an axis of rotation of said tire, each upper compression roller being positioned above said second side wall and being coupled to a first cam means, said first cam means lowering each upper compression roller to apply a compression force to the second side wall when the carriage means is moved from a tire loading position to a shearing position, thereby bringing bead wires of each side wall into overlying adjacent positions, a lower compression roller selectively contacting said first side wall, said lower compression roller being coupled to a second cam means, said second cam means repositioning said lower compression roller to apply a compression force to said first side wall when said carriage means is moved from a tire loading position to a shearing position, said lower compression roller being in communication with a spring, said spring biasing said lower compression roller in the direction of said first side wall, compression means associated with said carriage means for exerting a compression force on at least one side wall of said tire in a direction bringing bead wires of each sidewall into overlying adjacent positions, and rotary shearing means disposed near the forward shearing position of said path, for shearing said first and second side walls to a location closely tangential to said bead wires when said carriage means is moved from said tire loading position to said shearing position, and for causing tire rotation at the shearing position while shearing about the bead wire periphery, thereby separating said bead wires from the outer portion of said tire.

3. An apparatus for removing the bead wires from a tire comprising, a shearing means having at least two overlapping and counterrotating circular shears including a first shearing member supported on a first shaft and a second shearing member supported on a second shaft, said shafts spaced apart from each other by a distance less than a radius of said first shearing member to provide a pinch point between said shearing members, guide means for positioning a tire relative said shearing means, said tire having an inside diameter and opposed side walls, each side wall having a bead wire, said tire having an axis, said guide means positioning said tire axis perpendicular to the axes of said first and second shafts, compression means for exerting a compression force on at least one side of said tire, bringing opposed first and second tire side walls and bead wires into mutual proximity, said compression means including a first cam means and at least one compression roller having an axis perpendicular to the axis of said tire, each compression roller being positioned above said second side wall of said tire and being coupled to said first cam means, and advancement means for moving said guide means and said compression means, said advancement means being a carriage and said guide means being mounted to said carriage within the inside diameter of said tire, said first side wall of the tire at least partially contacting said carriage, said carriage having a first extreme position and a second extreme position, said carriage further having a path of motion from said first extreme position to said second extreme position which carries said tire into said shearing means, in a direction that is closely tangential to said bead wires, said first cam means lowering each compression roller to apply a compression force to the second side wall when the carriage is moved from said first extreme position to said second extreme position.

4. The apparatus of claim 3 wherein said compression means further includes a lower compression roller selectively contacting said first side wall, said lower compression roller being coupled to a second cam means, said second cam means raising said lower compression roller to apply a compression force to said first side wall when said carriage means is moved from said first extreme position to said second extreme position.

5. The apparatus of claim 4 wherein said lower compression roller is in communication with a spring, said spring biasing said lower compression roller in the direction of said first side wall.

6. An apparatus for debeading a tire of the type having an axis of rotation, laterally opposed first and second side walls, said first and second side walls each having an inner circumferential edge lying in a plane perpendicular to the axis of rotation and a bead wire closely adjacent said inner circumferential edge, comprising, A tire carriage means having tire positioning means for contacting the inner circumferential edges of first and second tire side walls and for elongating said inner circumferential edges, said tire carriage means having a path of movement, the path having a rearward tire loading position and a forward shearing position, compression means associated with said carriage means for exerting a compression force on at least one side wall of said tire at said inner circumferential edge and in a direction bringing bead wires of each sidewall into overlying adjacent positions, and rotary shearing means disposed near the forward shearing position of said path, for shearing said first and second side walls to a location closely tangential to said bead wires when said carriage means is moved from said tire loading position to said shearing position, and for causing tire rotation at the shearing position while shearing about the bead wire periphery, thereby separating said bead wires from the outer portion of said tire.

7. The apparatus of claim 6 wherein said compression means includes at least one compression roller having an axis perpendicular to an axis of rotation of said tire, each compression roller being positioned above said second side wall and being coupled to a first cam means, said cam means lowering each compression roller to apply a compression force to the second side wall when the carriage means is moved from a tire loading position to a shearing position.

8. The apparatus of claim 7 wherein said compression means further includes a lower compression roller selectively contacting said first side wall, said lower compression roller being coupled to a second cam means, said second cam means repositioning said lower compression roller to apply a compression force to said first side wall when said carriage means is moved from a tire loading position to a shearing position.

9. The apparatus of claim 6 wherein said positioning means includes a plurality of nonuniformly spaced rolls disposed within the inside diameter of the tire, each roll having an axis parallel to the axis of the tire and having a surface in contact with the inner circumferential edge of said side walls.

10. The apparatus of claim 5 wherein said rollers include a tensioning roll, said tensioning roll being movable to elongate the inner circumferential edges of said side walls.

11. The apparatus of claim 6 further comprising a crowding bar disposed to contact the inner circumferential edge of at least one side wall when said carriage means is in the tire loading position, said crowding bar being coupled to a first cam means, said first cam means lowering said crowding bar when said carriage means is moved toward said shearing position.

12. The apparatus of claim 11 wherein said crowding bar is pivoted to release said inner circumferential edge prior to said tire rotation caused by said rotary shearing means.

13. The apparatus of claim 6 wherein said shearing means includes first and second counterrotating circular shearing members, said first shearing member being supported on a first shaft and said second shearing member being supported on a second shaft spaced apart from said first shaft by a distance less than a radius of said first shearing member, said shearing members each having a circumference having a saw-toothed configuration.

14. An apparatus for removing the bead wires from a tire comprising, a shearing means having at least two overlapping and counterrotating circular shears including a first shearing member supported on a first shaft and a second shearing member supported on a second shaft, said shafts spaced apart from each other by a distance less than a radius of said first shearing member to provide a pinch point between said shearing members, guide means for positioning a tire relative said shearing means, said tire having an inside diameter and oposed side walls, each side wall having a bead wire, said tire having an axis, said guide means including a plurality of rolls disposed to contact the inside diameter of said tire, said guide means positioning said tire axis perpendicular to the axes of said first and second shafts, tensioning means for elongating said bead wires of the opposed side walls, said tensioning means including a movable tensioning roll nonuniformly spaced from said rolls of the guide means, compression means for exerting a compression force on at least one side of said tire at the bead wire of said side wall, bringing said bead wires of said opposed side walls into mutual proximity, and advancement means for moving said guide means, said tensioning means, and said compression means, said advancement means having a first extreme position and a second extreme position, said advancement means further having a path of motion from said first extreme position to said second extreme position which carries said tire into said shearing means, in a direction that is closely tangential to said bead wires.

15. The apparatus of claim 14 wherein said shearing means includes saw-teeth disposed about the circumference of each shearing member.

16. The apparatus of claim 14 wherein said advancement means is a carriage, said guide means being mounted to said carriage within the inside diameter of said tire.

17. The apparatus of claim 16 wherein said guide means includes a plurality of cylindrical rolls, each having an axis parallel said tire axis, and said tensioning means including a tensioning roll movably attached to said carriage for applying a stretching force to a portion of said tire.

* * * * *

UNITED STATES PATENT AND TRADEMARK OFFICE
CERTIFICATE OF CORRECTION

PATENT NO. : 4,738,172
DATED : April 19, 1988
INVENTOR(S) : Randel L. Barclay

It is certified that error appears in the above—identified patent and that said Letters Patent is hereby corrected as shown below:

Claim 10, column 9, line 55, "claim 5" should read - -claim 9- -.

Claim 14, column 10, line 27, "oposed side walls" should read
 - -opposed side walls- -.

Signed and Sealed this

Twenty-eighth Day of March, 1989

Attest:

DONALD J. QUIGG

*Attesting Officer*              *Commissioner of Patents and Trademarks*